United States Patent [19]

Gyarmati

[11] Patent Number: 5,910,821
[45] Date of Patent: Jun. 8, 1999

[54] METHOD AND DECODER FOR THE PROCESSING OF DATA WITHIN TELETEXT PAGES

[75] Inventor: Sandor Gyarmati, Villingen-Schwenningen, Germany

[73] Assignee: Deutsche Thomson-Brandt GmbH, Villingen, Germany

[21] Appl. No.: 08/970,902

[22] Filed: Nov. 14, 1997

[30] Foreign Application Priority Data

Nov. 19, 1996 [EP] European Pat. Off. .............. 96118501

[51] Int. Cl.⁶ .................................................. H04N 7/087
[52] U.S. Cl. .......................................... 348/468; 348/465
[58] Field of Search ................................... 348/468, 465, 348/466, 714, 473, 725; H04N 7/08, 7/087

[56] References Cited

U.S. PATENT DOCUMENTS

| 5,650,826 | 7/1997 | Eitz | 348/906 |
| 5,654,763 | 8/1997 | Bruckner et al. | 348/468 |
| 5,742,352 | 4/1998 | Tsukagoshi | 348/468 |

FOREIGN PATENT DOCUMENTS 0 742 669  11/1996  European Pat. Off. .
WO 94 29811  12/1994  WIPO .

OTHER PUBLICATIONS

Benoit, H., "Un Decodeur De Teletexte WST", Electronic Radio Plans, No. 521 Apr., 1991, pp. 53–59.

Primary Examiner—Victor R. Kostak
Attorney, Agent, or Firm—Joseph S. Tripoli; Joseph J. Laks; Sammy S. Henig

[57] ABSTRACT

For the transmission of additional data on a television channel the lines of the vertical blanking interval are used. It is intented to improve program information by so-called electronic program guides, which are based on the transmission of a large database. For these EPGs the additional data shall be broadcasted within the teletext data stream in a compatible manner. The EPG data are splitted into two data streams, wherein the transmitted data are organized in data blocks. Data blocks from different streams may interrupt each other. According to the invention the data pages (A, B) are stored sequentially in two different buffers (PA, PB) and processed alternatively. The blocks of the pages transmitted in the first stream are stored in a first block buffer (BB1) and the blocks of the pages transmitted in the second stream are stored in a second block buffer (BB2).

9 Claims, 2 Drawing Sheets

METHOD AND DECODER FOR THE PROCESSING OF DATA WITHIN TELETEXT PAGES

BACKGROUND OF THE INVENTION a. Field of the Invention

The present invention relates to a method and a decoder for the processing of data within teletext pages which can be used especially for electronic programme guides.

b. Description of the Prior Art

For the transmission of additional data on a television channel it is well known to use the lines of the vertical blanking interval, known as VBI lines. The transmitted data are usually organized in pages of about 1 kByte size. For a user-friendly selection of a special page various methods like the TOP method have been developed. The data are related to different kinds of information and include listings of program information. In order to make the use and content of these program information much more comfortable it is intended to introduce so-called electronic program guides (EPG), which are based on the transmission of a large database of program information. For these EPGs the additional data shall be broadcasted within the teletext data stream in a compatible manner.

SUMMARY OF THE INVENTION

It is the object of the invention to disclose a method for the processing of data within teletext pages, which requires only a small amount of memory and a small complexity of decoder software.

This object is reached by the inventive method disclosed in the present claim.

It is a further object of the invention to disclose a decoder which utilizes the inventive method.

The broadcasting of additional data like the data for an EPG can be provided in sub-pages of the teletext page 1DF but also in sub-pages of another page when defined so in the Magazine Inventory Page (MIP). If the EPG data are split into two streams, in the following called stream1 and stream2, the VBI can be used more effectively. The most important data shall be transmitted in stream1, where the pages apply the 20 ms-rule known from normal teletext in order to make these pages available also for older teletext decoders. In stream2 further pages are transmitted, which do not apply to the 20 ms-rule. Stream1 pages and stream2 pages are transmitted in irregular order and are identified by a specific value transmitted in the page sub-code. The transmitted data are organized in data blocks of 2 kByte maximum size. Therefore, due to the page size of about 1 kByte blocks from different streams may interrupt each other.

In principle the inventive method consists of the processing of data within teletext pages, wherein the data are organized in data blocks, wherein the pages are stored sequentially in two or more different buffers and that the data of a first page stored in a first buffer are processed during the time where the data of a second page are acquiring into a second buffer.

Advantageously the pages are processed in the same order as stored before.

Advantageously the data are transmitted within two streams of pages, wherein the pages of the two streams are stored in both of the two different buffers.

Preferentially the blocks of the pages transmitted in the first stream are stored in a first block buffer, the blocks of the pages transmitted in the second stream in a second block buffer.

For the processing of the data blocks advantageously the following steps are performed:

a) search for the block start;
b) identification of the block;
c) interpretation of Data Elements, especially calculation of data loops;
d) filtering of data elements;
e) storage of relevant data elements;

It is of advantage to apply a Hamming decoding to the data blocks in steps a), b) and c).

Preferentially after decoding the control block size the complete control block is Hamming decoded and the interpretation of data elements and their filtering is separated in a second process.

Furthermore, it is of advantage to stop the block processing and to wait for the next complete error free block, if Hamming errors are detected in application relevant data parts, and/or to check if a decoded, interpreted and filtered version of the current block already exists in the data base, wherein an already existing block is overwritten by the current block.

Advantageously the data are used in order to provide a electronic program guide.

In principle the inventive decoder for processing data within teletext pages, comprises an acquisition unit, which separates the data pages from the transmitted teletext pages and two or more different page buffers, in which the separated pages are sequentially stored.

Advantageously the decoder further comprises two different block buffers, in which the data blocks are stored.

Furthermore it is of advantage, if the decoder further comprises one or more processors for block decoding.

BRIEF DESCRIPTION OF THE DRAWINGS

Preferred embodiments of the invention will now be described with reference to the accompanying drawings, which show in.

DESCRIPTION OF THE PREFERRED EMBODIMENTS

Figure 1:
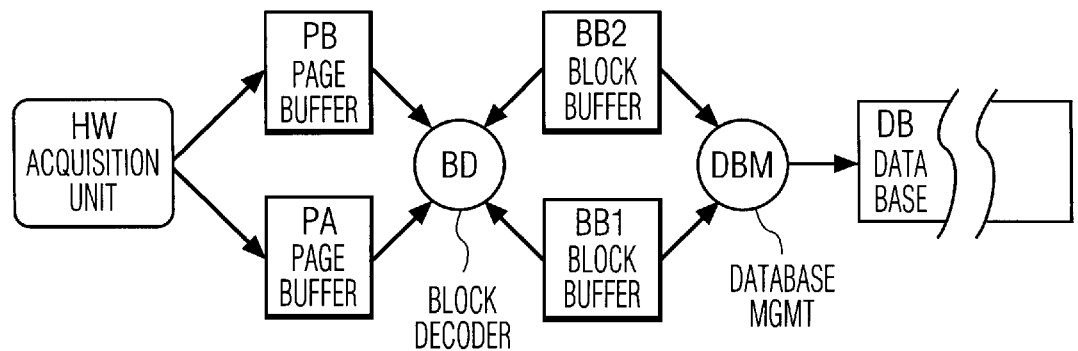
FIG. 1 a block-diagram of the data processing.

In FIG. 1 a block-diagram of the inventive data processing is shown. The data pages, which are typically transmitted as 1DF xxxx, are acquired by the acquisition unit HW and are stored sequentially in two different page buffers PA and PB. Both pages may originate from stream1 or stream2. When page A is completely acquired, data in buffer PA will be processed completely. During this time page B will be acquired into buffer PB. Page A processing will be finished before page A restarts to overload again buffer PA. When buffer A is completely processed and page B is completely acquired, buffer PB will immediately start to be processed.

The page processing is performed when all blocks are processed. The last block in a page may be not completed and be continued on the next page received in buffer PA or PB continuing the same stream (stream1 or stream2). In order to make this block interruption more unlikely a large page buffer with a capacity for a number of pages can be used for each of the 2 streams. This requires relatively large memory and does not totally overcome the problem with interrupted blocks.

Figure 2:
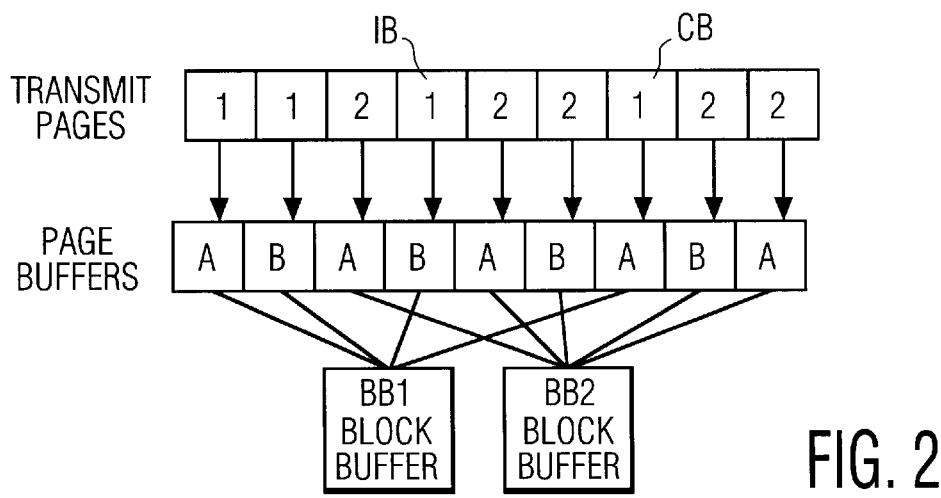
FIG. 2 the block buffering for an interrupted block.

Instead the problem can be solved by using two block buffers BB1 and BB2, each for a stream. This is shown in FIG. 2. For the transmitted pages in stream1 and stream2, symbolized by 1 and 2, a block interruption occurs in the transmitted page marked with IB. The interrupted block is continued in the next transmitted page belonging to stream 1, marked by CB. The transmitted pages are stored alternatively in the two page buffers A or B. The blocks of stream1, including the interrupted and continued block, which are buffered in both page buffers A and B, are stored in the block buffer for stream1 BB1. Correspondingly the blocks of stream2, which are also buffered in both page buffers A and B, are stored in the block buffer for stream2 BB2. If on the other hand only stream1 is transmitted or intended to be used by the application, only one block buffer would be necessary.

The transmitted data are organized in blocks with the following structure:

1) Block Header, which is Hamming 8/4 coded and contains the following data:
  application ID (all blocks with the same application ID belong to the same application/service)
  block size
  checksum
  control block size
  data type id
  conditional access bits
  copyright bit 2) Control part, also Hamming 8/4 coded, with the following data elements of a PI block as an example:
  linear data including the block number, start/stop time, loop lengths (i.e. escape sequence)
  loops, i.e. sort criterias, escape sequences 3) String part, which is odd parity coded like teletext, i.e. short info, long info, message info The block decoding can be performed in various forms. One possibility can be to start the interpretation only when all Hamming coded bytes are error free received. After a number of periodic reception of a block more and more errors will disappear under the assumption that non correctable Hamming errors do not appear each time in the same bytes. This concept implies that error free bytes are prevented from overwriting by new data. Therefore, refreshing of data cannot be applied easily.

Instead the block processing performed by the block decoder BD consists of following steps:
  a) Find Block Start
  b) Block identification
  c) Interpretation of Data Elements (especially calculation of data loops)
  d) Filtering Data Elements
  e) Store relevant Data Elements only (start stop time, one or more elements of a data loop)

Figure 3:
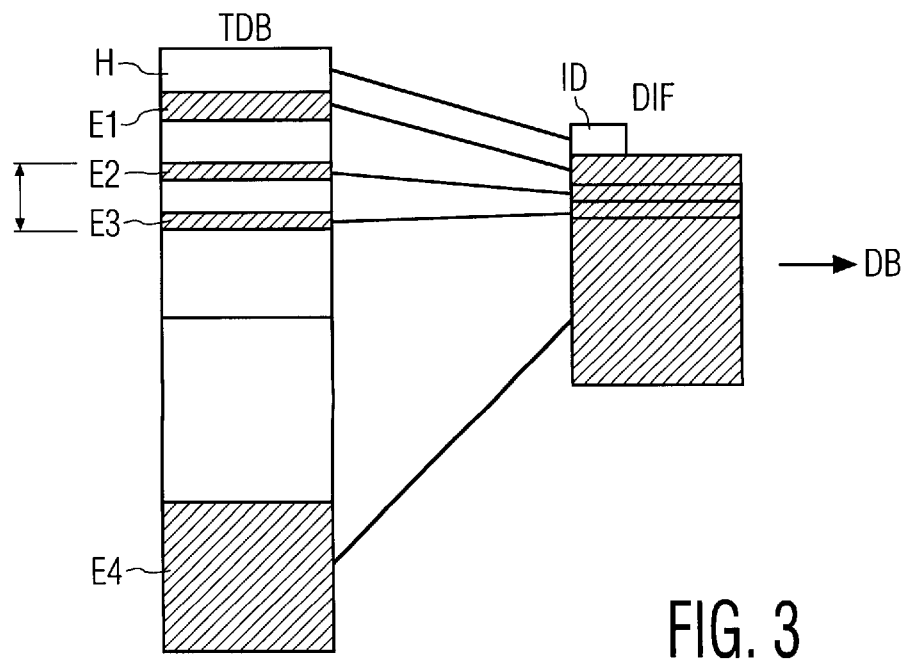
FIG. 3 the filtering of the relevant data elements in a block.

This is also sketched in FIG. 3. The transmitted data block TDB includes the block header H and several relevant data elements E1 to E4, wherein E2 and E3 are part of a data loop marked by the arrow. After decoding, interpretation and filtering only the relevant data DIF consisting of block ID and the data elements E1 to E4 are transferred to the data base DB. The hamming decoding is always applied in steps a) b) c). Only bytes carrying relevant data elements or parts of relevant data elements are required to be error free after hamming 8/4 decoding, therefore bytes carrying non-relevant data parts will not be hamming decoded and interpreted at all.

Figure 4:
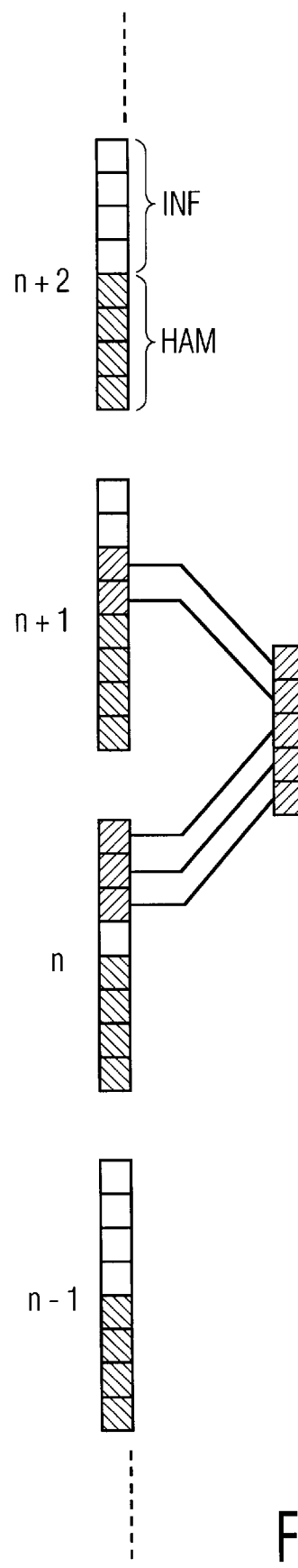
FIG. 4 the composition of a relevant data element.

This is also shown in FIG. 4. From the data stream four bytes n−1 to n+2 are shown, each consisting of four information bits INF and four hamming protected bits HAM. For the shown example the bytes n−1 and n+2 are not relevant for the application but bytes n and n+1.

Therefore, the relevant data element E1 is composed from information bits of byte n and n+1.

There is no reaction on errors, like waiting for the next acquisition, throwing away the complete block and the like. In this way the wasting of memory is reduced because the not relevant control data elements and the Hamming bits are not stored. Furthermore, data refresh/update is allowed at any time and the data block decoding is separated from the data base management.

If two processors are used, the following variant is of advantage. After decoding the control block size the complete control block is Hamming decoded with an error flag for each byte. The interpretation of data elements and their filtering is then separated in a second process.

If Hamming errors are detected in application relevant data parts, i.e. data which are used in the current application, the block processing is stopped and it is waited for the next complete error free one. Furthermore, it is checked if a decoded, interpreted and filtered version of the current block already exists in the data base. If an already existing block can be found, error free elements which can be unambiguously identified (their position may change in the transmitted block, if a data loop becomes longer, for instance one sorting criteria is added) may overwrite the same elements in the block received previously.

The invention can be used e.g. in TV receivers and VCRs or multi-media PCs equipped with a video/teletext capture card.

What is claimed is:

1. Method for the processing of data within teletext pages, wherein the data are organized in data blocks which are capable of being sized greater than a teletext page, wherein the data of the teletext pages are transmitted within two streams of pages, said method comprising the steps of:
  storing the teletext pages of the two streams sequentially in at least two different page buffers,
  analyzing a page stored in one of said at least two different page buffers and when the analyzed page corresponds to a block of the first stream, transferring the page to a first block buffer, and when the analyzed page corresponds to a block of the second stream transferring the page to a second block buffer, and
  processing the blocks in said first and second block buffers separately.

2. Method according to claim 1, wherein for processing of the data blocks the following steps are performed:
  a) search for the block start;
  b) identification of the block;
  c) interpretation of data elements, especially calculation of data loops;
  d) filtering of data elements;
  e) storage of relevant data elements.

3. Method according to claim 2, further comprising the steps of applying a Hamming decoding to the data blocks in steps a), b) and c).

4. Method according to claim 3, further comprising the steps of Hamming decoding a complete control block after decoding the control block size and wherein the interpretation of data elements and their filtering is separated in a second process.

5. Method according to claim 2 wherein the block processing is stopped until the next complete error free block, if Hamming errors are detected in application relevant data parts.

6. Method according to claim 2 further comprising the step of checking if a decoded, interpreted and filtered version of the current block already exists in the data base.

7. Method according to claim 6, wherein elements of an already existing block are overwritten by error free elements of the current block.

8. Method according to claim 1 wherein the data are used in order to provide an electronic program guide.

9. A decoder for the processing of data within teletext pages, wherein the data are organized in data blocks which are capable of being sized greater than a teletext page, wherein the data of the teletext pages are transmitted within two streams of pages, comprising an acquisition unit, which separates the data pages from the transmitted teletext pages, at least two different page buffers in which the separated pages are sequentially stored, an analyzation unit for analyzing to which stream a teletext page stored in one of the rage buffers belongs, at least two different block buffers, in which the data blocks of the different streams of pages are stored, and at least one processor for block decoding.

\* \* \* \* \*